United States Patent [19]

Cresap et al.

[11] Patent Number: 5,648,765
[45] Date of Patent: Jul. 15, 1997

[54] TAG TANSPONDER SYSTEM AND METHOD TO IDENTIFY ITEMS FOR PURPOSES SUCH AS LOCATING, IDENTIFYING, COUNTING, INVENTORYING, OR THE LIKE

[76] Inventors: Michael S. Cresap, 1294 Dorothy Rd., Crownsville, Md. 21032; Edward G. Plant, Jr., 7892 Americana Cir. Apt. 201, Glen Burnie, Md. 21060

[21] Appl. No.: 401,132

[22] Filed: Mar. 8, 1995

[51] Int. Cl.⁶ .................................................. G01S 13/75
[52] U.S. Cl. ........................ 340/825.35; 340/825.54; 342/42; 342/44
[58] Field of Search ..................... 340/825.31, 825.35, 340/825.49, 825.54, 572, 825.36; 342/42, 44, 51

[56] References Cited

U.S. PATENT DOCUMENTS

| | | | |
|---|---|---|---|
| 4,636,950 | 1/1987 | Caswell et al. | 340/825.54 X |
| 4,862,160 | 8/1989 | Ekchian et al. | 340/825.54 |
| 5,008,661 | 4/1991 | Raj | 340/825.54 |
| 5,012,236 | 4/1991 | Troyk et al. | 340/825.54 |
| 5,025,550 | 6/1991 | Zirbes et al. | 29/605 |
| 5,050,292 | 9/1991 | Zirbes et al. | 29/605 |
| 5,084,699 | 1/1992 | DeMichele | 340/825.54 |
| 5,095,309 | 3/1992 | Troyk et al. | 340/825.54 |
| 5,124,699 | 6/1992 | Tervoert et al. | 340/825.54 |
| 5,153,583 | 10/1992 | Murdoch | 340/825.54 |
| 5,198,807 | 3/1993 | Troyk et al. | 340/825.54 |
| 5,214,409 | 5/1993 | Beigel | 340/572 |
| 5,223,851 | 6/1993 | Hadden et al. | 343/873 |
| 5,231,273 | 7/1993 | Caswell et al. | 235/385 |
| 5,235,326 | 8/1993 | Beigel et al. | 340/825.54 |
| 5,245,332 | 9/1993 | Katzenstein | 340/825.54 |
| 5,294,931 | 3/1994 | Meier | 342/44 |
| 5,410,315 | 4/1995 | Huber | 342/42 |
| 5,434,572 | 7/1995 | Smith | 342/44 |
| 5,455,575 | 10/1995 | Schuermann | 342/42 |

FOREIGN PATENT DOCUMENTS 0 494 114 A2  7/1992  European Pat. Off. .......... 340/825.54

Primary Examiner—Brian Zimmerman
Assistant Examiner—William H. Wilson, Jr.

[57] ABSTRACT

A system and method for identifying items which each have an associated transponder that transmits an information encoded signal in response to a query signal and in which at least some of the information signals may occur at least in part simultaneously includes a receiver for receiving the information signals from at least some of the transponders. A signal processor identifies a strongest information encoded signal within the received signals and records the identified strongest information signal. The signal processor then subtracts the identified strongest information signal from the received signals, iterating the identifying, recording, and subtracting steps until all of the signals that can be identified are recorded. The signal processor is capable also to identify, record, and remove time displaced information signals.

14 Claims, 3 Drawing Sheets

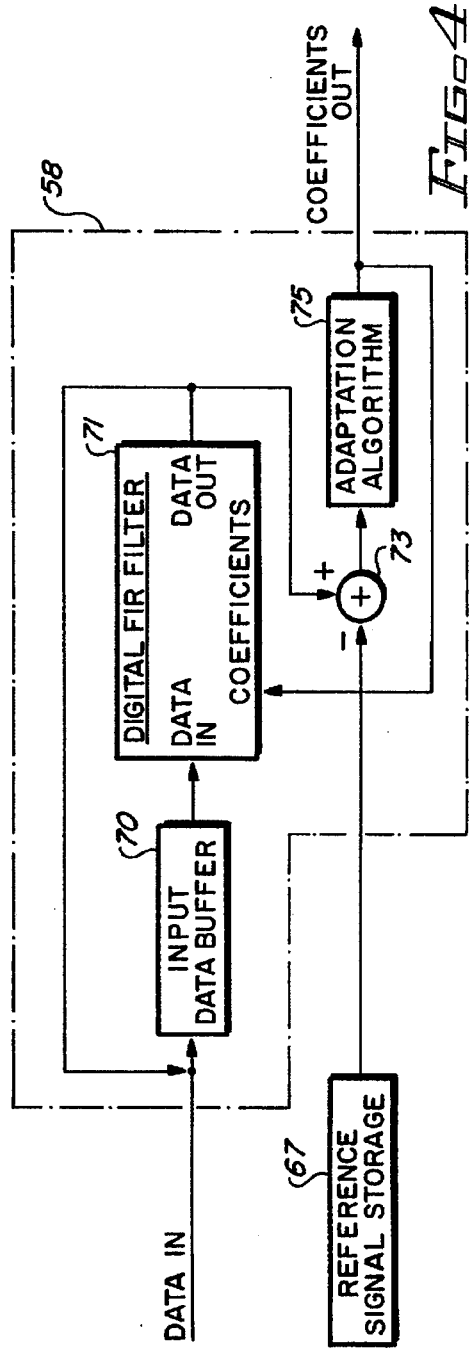

TAG TANSPONDER SYSTEM AND METHOD TO IDENTIFY ITEMS FOR PURPOSES SUCH AS LOCATING, IDENTIFYING, COUNTING, INVENTORYING, OR THE LIKE

BACKGROUND OF THE INVENTION

1. Field of the Invention

This invention relates to improvements in tag transponder systems, or the like, and more particularly to improvements in systems and methods for reading identification data simultaneously transmitted from a plurality of tag transponders that each emit an rf signal when a query rf signal is received, each tag being associated with a respective item to be located, counted, identified, or inventoried.

2. Relevant Background

Keeping track of items is often desirable in many settings. For example, in merchandising environments, it is commonplace to require accurate merchandise inventories. In many instances, items need to be tracked as they are moved from one location to another. For example, in farming industries, it is often important to keep track of livestock as they are penned, or as they are trucked or moved from one location to another. In the transportation industry, railroad cars are commonly tracked as they move from one location to another. In manufacturing industries, especially with the development of "just in time" supply theories, it is becoming more and more important to track parts as they are being manufactured, in order that they can be made available, as needed.

In other industries, tracking items is also important. For example, tracking containers, and more specifically, tracking tanks of the type used to contain and transport gas, such as helium, hydrogen, or other gas, is of particular interest (although the invention may be useful in many other applications, as will become apparent.)

Toward the end of tracking items of interest, tags of the type that emit an rf signal have been proposed, and are finding increasing use. One kind of tag that is of particular interest is the type of tag which is attached or otherwise associated with an item to be tracked and which emits such rf signal in response to a "query" signal broadcast by a reader system. This type of tag is generally referred to as a "transponder", having both a receiver to receive a "query" signal from the reader, and a transmitter that transmits predefined data in response back to the reader.

Tags of this type are often of very small or compact size, powered, for example, by a capacitor that stores a sufficient amount of energy from the inquiry signal to power the response or answer signal. The benefit of this arrangement is that no separate power supply need be provided, resulting in reduced tag size. Tags of this type are generally quiescent until the "query" rf signal is received, then operate to "wake up" to produce the responding rf signal.

Often such tags are designed to transmit the rf signal modulated with a code unique to the tag or to the item with which the tag is associated. For example, a tag may transmit an rf signal that is pulse code modulated (PCMed) with data to indicate a particular tag identification number. The tag identification number can be correlated, for example, with a particular item, identified, for instance, by a serial number, a product SKU number, or the like.

Since usually a number of tags are associated with a plurality of individual items, the query signal usually is designed to operate in one of a couple of ways, depending on the particular system with which it is associated. One way, for example, is to broadcast the query signal at a unique frequency that excites only a respective one of a plurality of tags. In such instance, in order to inventory a number of individual items with which the tags are associated, a number of query frequencies need to be transmitted to wake up, in turn, each of the tags, and each response needs to be logged. This type system requires precise frequency tuning of both the transmitter and receiver, and a number of frequencies must be precisely defined over the set of frequencies occupied by the tags.

Another system uses a transmitter in which the query signal is at one frequency, but all of the tags wake up and simultaneously broadcast an answer signal. In this type system, generally the return signals from all of the simultaneously transmitted return signals are simultaneously received and added together to provide a summed signal. The summed signal is then examined to determine the relative number of tags (or relative number of corresponding items with which the tags are associated.) Generally, such systems are not thought to be useful to identify particular items, such as by SKU number, serial number, or the like.

As will be apparent, for the transponder tag system to be useful, a transmitter/receiver processing system is needed. Typically, such processing system generates and sends the "query" signal that wakes up the transponder, as described above, receives the answer signal sent by the tag, and processes the data sent in the answer. The data, typically PCM information, must be demodulated and processed, according to the type of information contained. However, in the past, such processing systems have not been able to process individual tag data other than to detect the answer signals in "gross", to indicate only the total number of tags that have responded to an inquiry signal. What is needed therefore is a facility that can be used to transmit but a single "wake up" signal to a plurality of tag transponders, and to simultaneously receive and decode individual tag data to provide information about the individual items with which the tag transponders are associated.

SUMMARY OF THE INVENTION

In light of the above, therefore, it is an object of the invention to provide an improved tag transponder system and method to identify items for purposes such as locating, identifying, counting, or inventorying the items.

It is another object of the invention to provide an improved tag transponder system of the type described and method that can query a number of tag transponders simultaneously at a single frequency, and generate individual tag or item information from simultaneously received return signals from the tag transponders.

It is another object of the invention to provide a method for processing data that is simultaneously received from a plurality of tag transponders to separate information sent by individual ones of the tag transponders.

It is another object of the invention to provide an improved system to inventory items, which employs tag transponders of the type that transmit an information signal in response to an rf query signal.

It is another object of the invention to provide an improved gas tank identification system using tag transponders of the type described.

These and other objects, features and advantages of the invention will be apparent to those skilled in the art from the following detailed description of the invention, when read in conjunction with the accompanying drawings and appended claims.

In accordance with a broad aspect of the invention, a system for identifying individual ones of a plurality of items, such as tanks for containing gas, or the like, is presented. Each of the items has an associated transponder that transmits an information encoded signal in response to a query signal. At least some of the information encoded signals may occur at least in part simultaneously. The system includes a first receiver for receiving the information encoded signals from at least some of the transponders. A signal processor, which may be an integrated circuit digital signal processor, identifies a strongest information encoded signal within the received signals and records the identified strongest information signal. The signal processor then subtracts the identified strongest information signal from the received signals, iterating the identifying, recording, and subtracting steps until all of the signals that can be identified are recorded. The signal processor also may be designed to identify, record, and remove time displaced information signals.

In one embodiment, the system also includes a second receiver spaced from the first receiver for receiving the information encoded signals from at least some of the transponders, and wherein the signal processor identifies a strongest information encoded signal within the received signals from the second receiver, records the identified strongest information signal from the second receiver, subtracts the identified strongest information signal from the received signals from the second receiver, and iterates the identifying, recording, and subtracting steps until all of the signals that can be identified from the second receiver are recorded.

A computing circuit, such as a programmed digital computer, may also be provided to generate a composite list of information signals from the signals received by the first and second receivers, with duplicate information signals removed from the list.

According to another broad aspect of the invention, a method for identifying individual ones of a plurality of items is presented. Each of the items has an associated transponder that transmits an information encoded signal in response to a query signal. At least some of said information encoded signals may occur at least in part simultaneously. The method includes the steps of receiving at a first location the information encoded signals from at least some of said transponders. A strongest information encoded signal within the received signals is then identified, and the identified strongest information signal is recorded. The identified strongest information signal is then subtracted from the received signals, and the steps of identifying, recording, and subtracting are iterated until all of the signals that can be identified are recorded.

In one embodiment, the method additionally includes the steps of identifying, recording, and removing time displaced information signals.

In another embodiment, the steps are repeated from a second location, to recreate all of the signals that can be identified from the second location. When signals from a second location are recorded, a composite list of information signals is generated, and duplicate information signals are removed from the composite list.

BRIEF DESCRIPTION OF THE DRAWING

The invention is illustrated in the accompanying drawing, in which:

FIG. 1 is a block diagram of a tag transponder system in accordance with a preferred embodiment of the invention, used in conjunction with tag readers carried by a plurality of gas tanks, or the like.

FIG. 4 is a box diagram of a process for accomplishing the digital FIR adaptive equalizer function of FIG. 3, according to a preferred embodiment of the invention.

And FIG. 5 is a flow chart illustrating the process by which individual tag identification data is distinguished, removed, and logged, in accordance with a preferred embodiment of the invention.

In the various drawings, like reference numerals are used to denote like or similar parts. Additionally, the drawings are not necessarily drawn to scale.

DETAILED DESCRIPTION OF THE PREFERRED EMBODIMENTS

Figure 1:
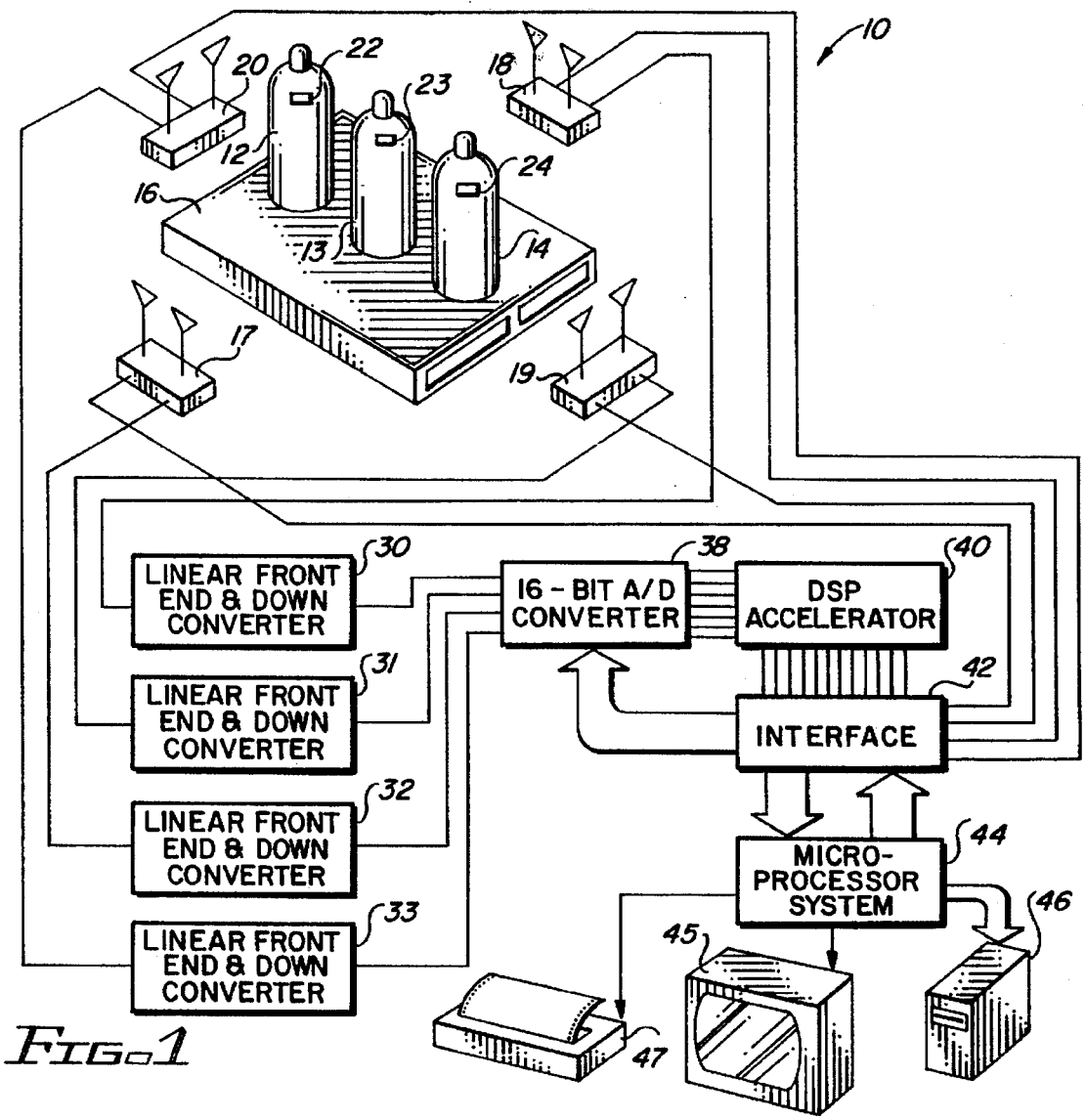

A block diagram of a tag transponder system 10, in accordance with a preferred embodiment of the invention, used in conjunction with tag readers carried by a plurality of gas tanks, or the like is shown in FIG. 1. As shown, a plurality of tanks 12–14, of the type, for instance, that can be used for containing gas, or the like, may be conveniently carried on a pallet 16 to enable the tanks to be transported from place to place, and more particularly into proximity with a number of transmitter/receiver units 17–20. (Of course, although gas tanks are shown, it will be apparent to those skilled in the art that the invention can be used to equal advantage in conjunction almost any other item as well.) Although only three tanks 12–14 are shown, it will be appreciated that any number of tanks can be provided as dictated by the physical size of the pallet, layout of the transmitter/receiver units 17–20, and other such physical limitations; however, each of the tanks must carry a tag transponder, such as the tag transponders 22–24, respectively, affixed thereto. Typically, for instance, sixteen 8-inch diameters cylinders may be carried on a single pallet may be used.

The transponders 22–24 are of the type that emit an rf identification encoded signal in response to a remotely generated "query" signal generated by the transmitter/receiver units 17–20. Such transponders are well known in the art.

The tag transponders 22–24 are self powered; that is, the tag transponders 22–24 are of the type that produce the power necessary to generate the identification signal from the power of the "query" signal. Consequently, the identification signal has a relatively low amplitude. (This low amplitude will be used, in part, to distinguish the signals from each of the tag transponders from the others, as below described.) In order to receive the low level identification signals from as many of the transponders as possible at each of the transmitter/receiver units 17–20, therefore, the tanks and their associated tag transponders are moved as closely as practical to the transmitter/receiver units 17–20. Thus, for example the transmitter/receiver units 17–20 may be attached to the top portion of a container, such that the tanks may be moved into the container by a fork lift, or the like, and raised into proximity with the transmitter/receiver units 17–20. Alternatively, the transmitter/receiver units 17–20 may be located adjacent a track or path along which the tanks may be conveyed in proximity to the transmitter/receiver units 17–20.

Because the rf information signals that are transmitted by the tag transponders 22–24 are at a relatively low level, the attenuation effects due to the relative distances of the tag transponders 22–24 from the transmitter/receiver units 17–20 will be apparent at each of the transmitter/receiver units 17–20. Because this attenuation factor will be important in distinguishing the signals of each of the tag transponders 22–24, the placement of the transmitter/receiver units 17–20 may be adjusted so that the signal strengths of the signals from the tag transponders 22–24 vary over a range from most to least strong. In fact, since a number of transmitter/receiver units 17–20 are used, it may be permissible to allow the signal from the most remote tag transponder to be only barely discernable, or not detectable at all, as it will be redundantly detected by a closer transmitter/receiver unit, as will be apparent. On the other hand, although not absolutely essential in most instances, depending upon the particular application, the level of the "query" signal generated by the transmitter/receiver units 17–20 may be established to be sufficiently strong to reach and activate all of the tag transponders 22–24 throughout the entire range at which tanks may be located.

The exact number of transmitter/receiver units necessary for thorough data reception from the tag transponders 22–24 may vary, depending upon the signal strength from the particular tag transponders 22–24 used, the arrangement of the tag transponders 22–24 on the pallet 16, the particular delay associated with identification signal emitted from the tag transponders 22–24, and other similar factors. Ideally, since two or more tag transponders 22–24 may be equally radially located from two spaced transmitter/receiver units, three transmitter/receiver units may be required to unambiguously identify all of the tag transponders to be distinguished if the relative amplitudes of the information signals is the only factor by which the signals are to be distinguished. As will become apparent, other cues may also be present in the information signals by which they can be distinguished, so in some cases, less than three transmitter/receiver units may sometimes be used. On the other hand, if redundant information is detected, that is, if a particular tag transponder signal is detected by two or more transmitter/receiver units, the redundant signal can easily be identified and separated. Consequently, there is no actual upper limit on the number of transmitter/receiver units that may be utilized in any particular system. One advantage provided by multiple transmitter/receiver units in a system in which the field strength of the information signals spatially varies is that the transmitter/receiver units can be placed to deliberately receive some but not all of the identification signals, which results in reduced decision time required by the transmitter/receiver units, since not all of the data need be processed by all of the transmitter/receiver units.

With reference again to FIG. 1, the signals that are detected by the receivers of the transmitter/receiver units 17–20, each of which representing at least simultaneously occurring information signals from the tag transponders 22–2, are directed to respective linear front end and down converter circuits 30–33. In contrast to many prior art systems, since the amplitudes of the various information signals is used to distinguish each signal from another, the front end circuits 30–33 must be constructed to linearly process the signals simultaneously received by each transmitter/receiver unit. (It is noted that the simultaneous signals of interest are the signals received by each transmitter/receiver unit. There is essentially no temporal requirement for the signals among the various transmitter/receiver units.)

The outputs from the linear front end and down converter circuits 30–33 are connected to inputs of a 16-bit analog-to-digital (A/D) converter 38. A/D converters of the type that have multiple analog inputs that can be selectively processed are known in the art. The 16 bit output from the A/D converter 38 is connected to a digital signal processor (DSP) accelerator 40, as shown. One suitable DSP circuit that can be used, for instance, is a integrated circuit digital signal processor identified as a TMS320C30, sold by Texas Instruments Incorporated. Alternatively, each of the linear front end and down converter circuits 30–33 may have its own respective associated A/D and DSP circuits to increase the speed at which the signal digitizing and processing occurs, if desired. The signal processing function also can be performed entirely within the associated computer system, below described, depending upon the application and the desired speed of signal identification and processing.

The output from the DSP accelerator circuit 40 is connected to an appropriate interface 42 to interface the DSP result to a computing circuit, such as the microprocessor system 44, which may be, for example, a DOS based 486/66 computer, or other suitable programmed digital computer or digital processing device, that outputs the processed data for display on a monitor 45, for recording on a disk drive 46, and/or for printing on a printer 47. The interface circuit 42 provides control signals, as directed by the microprocessor system 44, to the 16-bit A/D converter 38 to select which of the output signals from the linear front end and down converter circuits 30–33 is converted for processing. Also, the interface circuit provides control signals to the transmitter/receiver units 17–20 to signal the transmitter portion of each when to transmit its "query" signal to activate the tag transponders 22–24 on the tanks 12–14.

Figure 2:
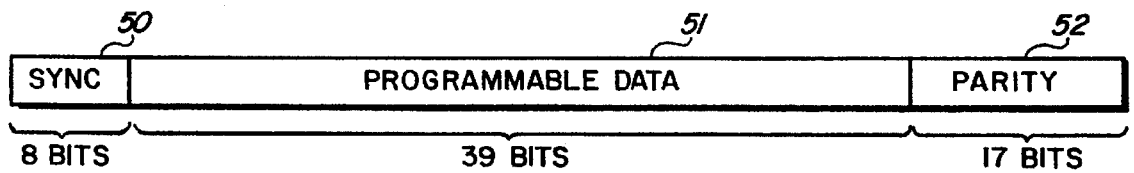
FIG. 2 is a diagram of a typical format of a PSK information signal transmitted by a tag transponder in response to an "inquire" signal, containing tag identification data to be processed and separated by the system, in accordance with the invention.
Figure 1A:
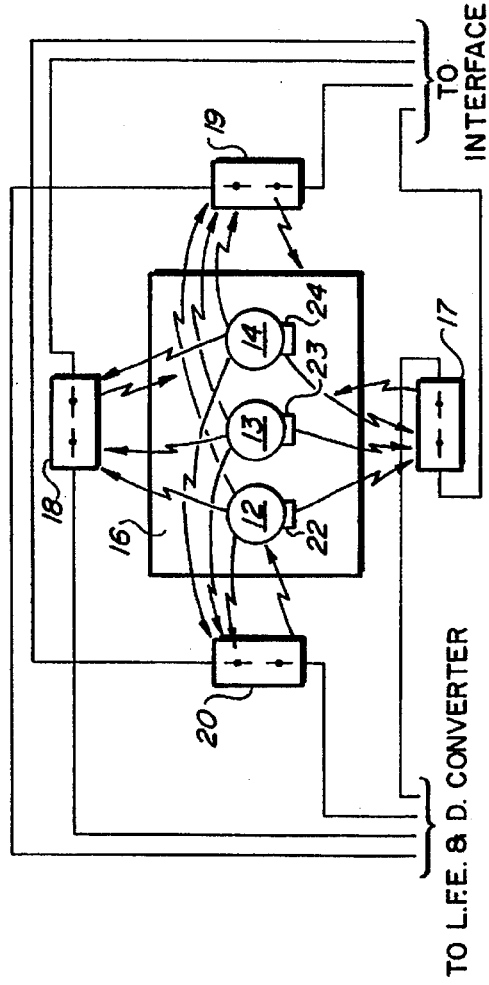
FIG. 1A is a simplified schematic of the system illustrated in FIG. 1.

Thus, in operation, and referring to FIGS. 1 and 1A, the tanks 12–14 are first moved into operative proximity with the transmitter/receiver units 17–20, as described above. The microprocessor system 44 initiates a start signal to a selected one of the transmitter/receiver units 17–20, such as the transmitter/receiver unit 17, causing it to transmit an "query" signal to the tag transponders 22–24. The tag transponders 22–24 interrogated by the "query" signal each respond with an identification signal that is unique to the particular responding tag transducer. The identification typically is a PSK multibit serial stream, a typical format for which being shown in FIG. 2. The format of the information signal is a 64 bit data stream that has, for example, an initial 8 bits for synchronization 50, a following 39 bits containing programmable identification data 51, and a final 17 bits containing parity information 52. Thereafter, those information signals which are within range of the receiver portion of the transmitter/receiver unit 17 are received and conducted to the associated linear front end and down converter 30.

The microprocessor system, at the same time, selects the input channel which receives the output from the linear front end and down converter circuit 30, and digitizes it, producing a 16-bit output to the DSP accelerator circuitry 40. The DSP accelerator circuitry 40 processes the data and transfers it to the microprocessor system 44 via the interface circuitry 42 for display on the monitor 45, recording by the disk drive 46, or printed out on the printer 47. The processing of the data to separate the simultaneously, or at least partially simultaneously, received information data from the tag transponders 22–24 is described below in detail.

The process is then repeated for each of the other transmitter/receiver units 18–20, in turn, resulting in the collection of processed data representing the identification of the data received by each respective transmitter/receiver unit 17–20. From this collection of data, the data representing redundantly occurring tag transponder identification signals may be removed, leaving a list of the uniquely recognized identification signals. The list then represents a complete inventory of the tag transponders 22–24, and more particularly, the tanks with which the tag transponders 22–24 are attached.

The processing of the simultaneously received tag transponder information data is performed to selectively identify and remove each identification signal from the captured received data stream. As mentioned, each transmitter/receiver unit 17–20 simultaneously receives a plurality of information signals from at least some of the tag transponders 22–24. The information signals have at least two distinguishing characteristics: (1) they are of possible different amplitude or signal strength, and (2) they contain information signals that are possibly delayed in phase from each other. On the other hand, it will be appreciated that the signals may be received, depending upon the fortuitous physical location of the tanks to be inventoried and the particular characteristics of the tag transponders, with no differences in signal strength or data phase. If the latter condition is problematic, more than one transmitter/receiver unit may be provided to enable the otherwise inseparable data to be distinguished.

Figure 3:
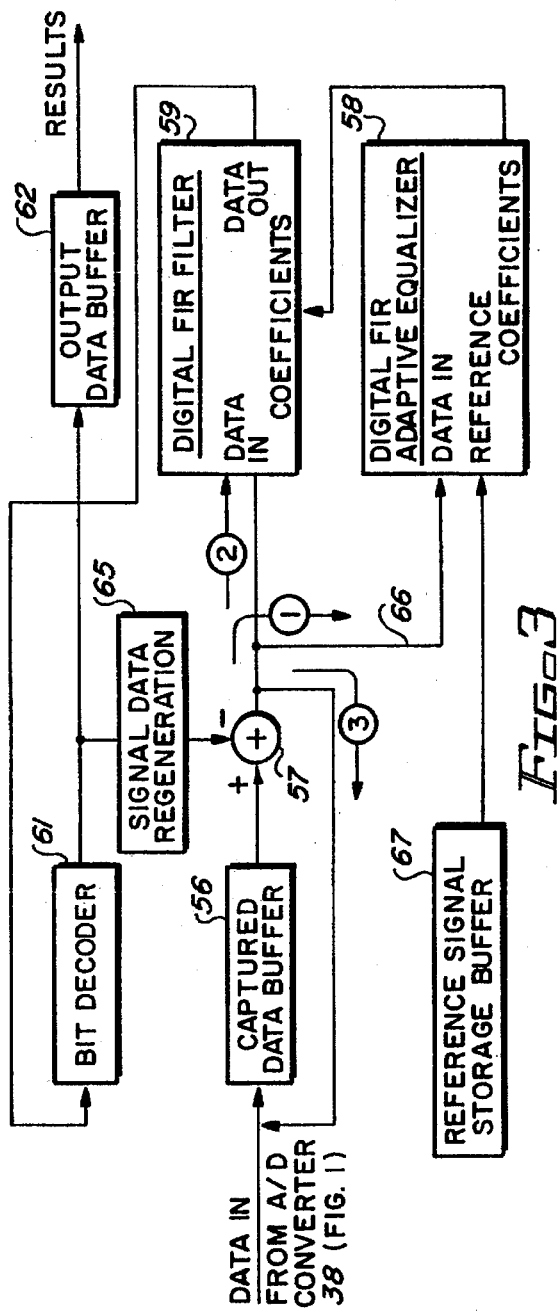
FIG. 3 is a box diagram of a process for selectively identifying and removing each identification signal from the captured received data stream by the system according to a preferred embodiment of the invention.

A box diagram representing the functions that are performed in the process for selectively identifying and removing the data signals that are received from each tag-transponder is shown in FIG. 3. Although a circuitry-type box diagram is shown in FIG. 3, the functions described are preferably performed under the control of a software program, either in the operation of the DSP circuitry 40, or entirely within the microprocessor system 44.

As shown, the captured data stream that contains the collection of data that has been received from one of the transmitter/receiver units, such as transmitter/receiver unit 17 (see FIG. 1) and digitized by the 16-bit A/D converter 38, is directed to a captured data buffer 56. The amount of data that is collected in the captured data buffer 56 from the input serial data stream is selected to be sufficiently long to contain at least one valid data word, its accompanying synchronizing data, and its associated parity data. Because the collection of data contains tag-transponder data that may be delayed with respect to other tag-transponder data, the length of the data stream contained in the captured data buffer 56 should be sufficiently long to contain also any such delayed data. On the other hand, the length of the data stream contained preferably should not be of such length that it would contain two data words, as separation of the individual tag data may become unduly involved.

The data contained in the captured data buffer 56 is then recirculated a number of times for each item of data to be detected and extracted. More particularly, for each tag transponder data that is to be decoded and removed from the input data stream, the data within the captured data buffer 56 is recirculated three times. During the first recirculation, the data is operated on by a digital finite impulse response (FIR) equalizer function 58. Details of the digital FIR equalizer function 58 are described below. The digital FIR equalizer function 58 operates to identify a valid data signal from the data contained in the recirculated data, and to generate coefficients to a digital finite impulse response (FIR) filter function 59 to enable the digital FIR filter function 59 to strip the unwanted signals from recirculated data during a second data recirculation.

Additionally, a reference signal is brought into the digital FIR adaptive equalizer function 58 from a reference signal storage buffer 67. The reference signal contained in the reference signal storage buffer 67 may be selected to represent the synchronization sequence that is associated with each of the tag-transponder data. Thus, during the operation of the digital FIR adaptive equalizer function 58, a type of cross-correlation or comparison operation is performed between the reference signal from the reference signal storage buffer 67 and at least a portion of the recirculating data from the captured data buffer 56. During the comparison operation, the digital FIR adaptive equalizer function 58 generates the coefficients necessary to enable the digital FIR filter function 59 remove everything from the recirculating data stream except the detected strongest data signal, which has the highest degree of correlation with the reference signal from the reference signal storage buffer 67.

Thus, during the second recirculation of the data, the data is operated on by the digital FIR filter function 59, which, as mentioned, operates on the recirculating data according to the coefficients provided from the digital FIR adaptive equalizer function 58. The digital FIR filter function 59 strips the unwanted signals from recirculated data to provide an output that grossly represents the desired tag-transponder information. The data developed by the digital FIR filter function 59 is then operated on by a bit decoder function 61, which is necessary to assure that the original data, which is over sampled by the A/D converter 38 at the input, accurately represents the desired data form for output and to remove the synchronization and parity data. The output of the bit decoder 61, representing the desired final decoded tag-transponder data, can be buffered, if desired, by an output data buffer 62 and held for convenient output.

As the data from the output of the bit decoder function 61 is conducted to the output data buffer 62, the data within the captured data buffer 56 is recirculated for the third time. As the data recirculates the third time, the output of the bit decoder 61 is operated on by a signal data regeneration function 65 which serves to regenerate the original, or received, form of the data. This is necessary because the original data was modified by the digital FIR filter function 59 and the bit decoder function 61, and, in order to enable the detected data to be effectively subtracted from the recirculating data, the data to be subtracted needs to be in its original form, including the synchronization and parity data. Thus, the signal data regeneration function 65 serves to undo the decoding performed by the bit decoder function 61, and to add back the synchronization and parity bits to the data stream to enable the detected data to be subtracted from the recirculation data collection.

The data which remains in the captured data buffer 56, after the detected data word has been subtracted, then represents the remaining collection of data words from the data collected from the transmitter/receiver being processed. These data vary according to their respective amplitudes and relative delays, and can be removed in successive iterations of the foregoing process. The process is repeated until no more data can be detected.

The process is then repeated for the data collected by each of the remaining transmitter/receiver units 18–20, in turn, thereby logging each of the separable individual information signals contained in the respective consolidation of simultaneously received signals from each transmitter/receiver unit. Thereafter, the logged individual signals may be compared to identify duplicate information signals, which can be deleted from the log. The resulting log is then displayed on the monitor 45, recorded by the disk drive 46, or printed out on the printer 47.

The details of the digital FIR adaptive equalizer function 58 are shown in FIG. 4. The FIR adaptive equalizer function 58 receives the captured data from the captured data buffer 56 (FIG. 3) into an input data buffer 70, from where it will be recirculated a number of times until the development of the output coefficients is complete. The data within the input data buffer 70 is filtered by a digital FIR filter function 71, which applies the developed coefficients at the output of the digital FIR adaptive equalizer to the recirculating data. The digital FIR filter 71 may be designed according to techniques described by Kuo et al., "Implementation of Adaptive Filters with the TMS 320C25 or the TMS320C30", *Digital Signal Processing Applications with the TMS 320 Family*, Texas Instruments, p. 191, et seq. (1990), incorporated by reference herein. Initially, during the first data recirculation, the coefficients are zero, or null, and have no effect on the recirculating data. The reference signal stored in the reference signal storage buffer 67 is then subtracted from recirculating data by a summer function 73, and the difference processed in accordance with an adaption algorithm 75.

The adaption algorithm 75 may be configured to iteratively solve the equation:

$$\overline{W}_n = \overline{W}_{n-1} \mu e(n-1)\overline{X}_{n-1}$$

Wherein:

$e(n-1)$ is the single error value computed from filtering $\overline{X}_{n-1}$ with $\overline{W}_{n-1}$, and then comparing with the resulting output sample to a reference signal data point.

$\overline{W}_n$ is a new set of coefficients for the next input data sample.

$\overline{W}_{n-1}$ is the last set of coefficients which were used to compute $e(n-1)$ and $\overline{X}_{n-1}$.

$\mu$ is a convergence factor, which is a constant determined through experimental observation of the convergence characteristics of the adaption process.

And $\overline{X}_{n-1}$ is the set of input data which appears at the input of each delay element of the filter after each new data element is shifted in.

This equation is computed once for each new data sample shifted into the filter delay elements. The error term is monitored by loop control software to determine when to stop the equalizer. Once the error term reaches a predetermined minimum value, the loop is stopped and the equalizer is deemed "converged." At this point the final set of coefficients is passed to the digital FIR filter 71 to use in extracting the signal of interest. Additional details of suitable adaption algorithms may be seen in Clarkson, *Optimal and Adaptive Signal Processing*, CRC Press, Inc, pp 162–165 (1993), incorporated by reference herein.

Thus, the adaption algorithm 75 develops a first set of coefficients for application to the digital FIR filter function 71 during the next recirculation of the data contained in the input data buffer 70. The modified recirculating data is then recirculated a second time. During the second recirculation, the modified recirculating data is again modified by the digital FIR filter function 71 according to the coefficients developed during the first data recirculation, modified by the reference signal again being subtracted from it, and applied to the adaption algorithm to produce a second set of coefficients for application to the digital FIR filter function 71 during the next data recirculation. This data recirculation is continued until the error term reaches a predetermined minimum. At that point, the coefficients are delivered to the digital FIR filter 59, shown in FIG. 3.

Summarizing the signal identification process, with respect to the flow chart of FIG. 5, at the start of the process, box 80, a first of the n transmitter/receiver units is selected. The data from the nth transmitter/receiver unit is captured and brought into the system, box 82. The strongest signal contained in the captured data is identified and removed, box 84, then logged, box 86. It should be noted that a check is made of the strongest identified signal to insure that it is a legitimate signal by performing a parity check on the recovered data. This is done after a comparison with a signal sequence, for example, of synchronization bits and signal length, to be sure that the signal identified properly correlates with the comparison signal and does not represent, for example, decoded "noise" within the captured data.

If a legitimate signal was removed, diamond 88, indicating that possibly additional signals may be contained in the captured data signal, the process is repeated of identifying and logging the strongest signal (originally the second strongest signal, but now the strongest since the originally strongest signal has been removed). The process is iterated until no additional signal can be removed, diamond 88.

If any of the n transmitter/receiver units have not been checked, diamond 90, the next transmitter/receiver unit is selected, box 92, and the entire process is repeated. This is continued until the signals from each of the n transmitter/receiver units have been captured, and the identifiable signals captured by each have been processed.

When all of the n transmitter/receiver units have been processed, as determined in diamond 90, the logged signals are compared, and the duplicate signals are removed, box 94. The remaining signals are then recorded, displayed, or printed, box 96, and the process is ended, circle 98. In light of the foregoing, it will be appreciated that through the use of the method and system described, items, such as the tanks illustrated, can be readily located, identified, counted, inventoried, or logged. Other uses will be immediately evident to those skilled in the art.

Although the invention has been described and illustrated with a certain degree of particularity, it is understood that the present disclosure has been made only byway of example, and that numerous changes in the combination and arrangement of parts can be resorted to by those skilled in the art without departing from the spirit and scope of the invention, as hereinafter claimed.

We claim:

1. A system for identifying individual ones of a plurality of items, each having an associated transponder that transmits an information encoded signal in response to a query signal, at least some of said information encoded signals possibly occurring at least in part simultaneously, comprising:

a first receiver for receiving the information encoded signals from at least some of said transponders, and a signal processor for identifying a strongest information encoded signal within the received signals, recording the identified strongest information signal, subtracting the identified strongest information signal from the received signals, and iterating the identifying, recording, and subtracting steps until all of the signals that can be identified are recorded.

2. The system of claim 1 wherein said information encoded signal of each transponder is an rf signal.

3. The system of claim 1 wherein said signal processor additionally identifies, records, and removes time displaced information signals.

4. The system of claim 1 further comprising a second receiver spaced from said first receiver for receiving the information encoded signals from at least some of said transponders, and wherein said signal processor identifies a strongest information encoded signal within the signals from said second receiver, records the identified strongest information signal from said second receiver, subtracts the identified strongest information signal from the received signals from the second receiver, and iterates the identifying, recording, and subtracting steps until all of the signals that can be identified from the second receiver are recorded.

5. The system of claim 4 further comprising a computing circuit to generate a composite list of information signals, with duplicate information signals removed from the list.

6. The system of claim 5 wherein said computing circuit is a programmed digital computer.

7. The system of claim 6 wherein said signal processor is in integrated circuit digital signal processor.

8. The system of claim 1 wherein said items are tanks for containing gas.

9. A method for identifying individual ones of a plurality of items, each having an associated transponder that transmits an information encoded signal in response to a query signal, at least some of said information encoded signals may occur at least in part simultaneously, comprising:

receiving at a first location the information encoded signals from at least some of said transponders, identifying a strongest information encoded signal within the received signals, recording the identified strongest information signal, subtracting the identified strongest information signal from the received signals, and iterating the identifying, recording, and subtracting steps until all of the signals that can be identified are recorded.

10. The method of claim 9 further comprising additionally identifying, recording, and removing time displaced information signals.

11. The method of claim 9 further comprising:

receiving the information encoded signals from at least some of said transponders from a second location, identifying a strongest information encoded signal within the received signals at said second location, recording the identified strongest information signal from said second location, subtracting the identified strongest information signal from the received signals from the second location, and iterating the identifying, recording, and subtracting steps until all of the signals that can be identified from the second location are recorded.

12. The method of claim 11 further comprising generating a composite list of information signals, and removing duplicate information signals removed from the composite list.

13. Apparatus for automatically inventorying a plurality of items, comprising:

a plurality of transponders, each for sending in response to a query signal a digital identification signal that includes a synchronization code and an identification code, each of said plurality of transponders being carried on a respective item to be inventoried;

a plurality of transmitter/receiver units, each for sending a query signal, and for receiving the digital identification signals from at least some of said transponders;

a digital signal processor programmed to process the simultaneously received digital identification signals from each receiver identifying a strongest digital identification signal within the received digital identification signals, placing the identified digital identification signal on an inventory list, subtracting the identified digital identification signal from the simultaneously received digital identification signals, and iterating the identifying and following steps until all digital identification signals that can be identified are placed on the inventory list.

14. A method for inventorying a plurality of items, each carrying a transponder that sends in response to a query signal a digital identification signal that includes a synchronization code and an identification code, each of said plurality of transponders being carried on a respective item to be inventoried;

a plurality of transmitter/receiver units, each for sending a query signal, and for simultaneously receiving the digital identification signals from at least some of said transponders;

a digital signal processor programmed to process the simultaneously received digital identification signals from each receiver identifying a strongest digital identification signal within the received digital identification signals, placing the identified digital identification signal on an inventory list, subtracting the identified digital identification signal from the simultaneously received digital identification signals, and iterating the identifying and following steps until all digital identification signals that can be identified are placed on the inventory list.

* * * * *